April 15, 1969  R. J. MELTZER  3,438,712
MAGNETO-OPTICAL DISPLACEMENT SENSING DEVICE
Filed July 1, 1963 Sheet _1_ of 6

ROBERT J. MELTZER
INVENTOR.

BY Frank C. Parker
David C. Dougherty
ATTORNEYS

April 15, 1969 R. J. MELTZER 3,438,712
MAGNETO-OPTICAL DISPLACEMENT SENSING DEVICE
Filed July 1, 1963 Sheet _2_ of 6

ROBERT J. MELTZER
INVENTOR.

BY *Frank C. Parker*
*David E. Dougherty*
ATTORNEYS

ROBERT J. MELTZER
INVENTOR.

BY Frank C. Parker
David E. Dougherty
ATTORNEYS

April 15, 1969     R. J. MELTZER     3,438,712

MAGNETO-OPTICAL DISPLACEMENT SENSING DEVICE

Filed July 1, 1963

ROBERT J. MELTZER
INVENTOR.

BY Frank C. Parker
David E. Dougherty
ATTORNEYS

ROBERT J. MELTZER
INVENTOR.

United States Patent Office 3,438,712
Patented Apr. 15, 1969

3,438,712
MAGNETO-OPTICAL DISPLACEMENT
SENSING DEVICE
Robert J. Meltzer, Irondequoit, N.Y., assignor to Bausch
& Lomb Incorporated, Rochester, N.Y., a corporation
of New York
Filed July 1, 1963, Ser. No. 291,998
Int. Cl. G01n 21/00; G01j 3/00; G02f 1/22
U.S. Cl. 356—117                                   8 Claims This invention relates to a novel magneto optical system and more particularly to a system having a high degree of accuracy.

Recent developments in technology have produced an increased demand for precision optical instruments. For example, there is a relatively large demand for precision optical positioning and measuring systems. Positioning and measuring systems of this type are applicable for numerous commercial, scientific and military endeavors.

In order to satisfy the technological demands, it is desirable to provide a system which is accurate to one millionth of an inch or better. It is also highly desirable to minimize the number of moving parts in precision optical instruments. It would be particularly advantageous to provide an exceptionally accurate optical positioning system without any moving parts.

One consideration when designing optical positioning and measuring systems relates to the range of the system. A wide range i.e. the capability of locating a line within a wide field is particularly desirable. Systems of this type should also be insensitive to focal variations and capable of high speed operation. Furthermore the systems should be capable of measuring as well as detecting departure from an exact set, as well as, indicating the direction of departure from the set position.

The accuracy of the magneto optical systems disclosed and claimed hereinafter are such that they enable an operator to position a line with an accuracy of one micro inch or better. There are indications for example, that the presently obtainable micro inch capability is not an upper limit. These indications suggest that a ten fold increase in sensitivity may be obtainable by refinements or improvements in the present systems.

Advantageously the magneto optical systems according to the present invention have at least from a practical viewpoint a minimum number of moving parts. For example, a positioning system according to one embodiment of the present invention does not have any moving parts. Even though the number of moving parts have been minimized and exceptional accuracy has been obtained, it has not been necessary to sacrifice other desirable features. Systems of the type disclosed and claimed herein, have a wide range, are relatively insensitive to focal variations, and are capable of high speed operations. In addition to the aforementioned features, the systems are capable of measuring departure from an exact set and indicating the direction of departure.

Furthermore, the systems according to the present invention have been incorporated in a wide variety of measuring and control devices to provide numerous improvements in the optical field. For example, various embodiments of the present invention are directed to improved autocollimators, novel alignment telescopes, improved motion transducers, improved means for checking surfaces, novel systems for bearing correction, and improved apparatus for lens centering. Other embodiments are directed to an improved range finder, improved tracking devices, improved tracking telescopes, improved means for generating straight ways and etc.

Briefly, the magneto optical systems according to the present invention are characterized by the combination of position sensitive polarization means which include a pair of optically active elements of opposite rotation, magneto optical modulation means and electrical means for producing a signal. The phase of the signal depends on the sense while the amplitude depends on the amount of displacement of an image from the optic axis. The basic theory underlying the invention is set forth in some detail in the published article entitled, "Magneto Optic Positioning" by Robert J. Meltzer, which appears in "IEEE Transactions on Industrial Electronics," vol. 1E10, No. 1, May 1963.

Magneto optical modulators or Faraday modulation may be described with reference to a novel positioning system according to one embodiment of the present invention. The systems include a light source, a pair of polarizers, a modulator disposed between the polarizers and a photo-detector. The light source may be considered to include a lamp, a collimator and a narrow band filter for producing nominally monochromatic light. The modulator may comprise a piece of flint glass or other transparent material within a coil of wire. Passing alternating current through the wire produces a magnetic field within the coil. The direction and magnitude of this magnetic field varies as the current in the coil varies. The plane of polarization of light passing through the glass is rotated by the magnetic field according to the Faraday magneto optic effect. The angle through which the plane is rotated depends on the material, the length of the path through the material and the strength of the magnetic field. The direction of the rotation depends on the magnetic field. The transparent materials have a Verdet constant which gives the angular rotation in minutes of arc, per centimeter of path, per gauss of field.

Since the two polarizers are at right angles to each other light will not pass through the polarizer to the detector in the absence of a magnetic field. However, with a magnetic field light will pass to the detector as the plane of polarization is rotated by the field. Therefore, the light intensity impinging upon the photocell varies according to the changes in rotation caused by the alternating current produced field in the modulator. Measurement of the rotation may be accomplished by measuring the amplitude of the frequency and by knowing the constant of the system which depends on the material, the path length and the peak modulating current.

The photodetector produces an electrical signal in response to the light intensity impinging thereupon. The electrical signal is amplified and fed into a demodulator which is connected to a meter for indicating the displacement and direction.

The invention will now be described in connection with the accompanying drawings; in which, FIG. 1 is a schematic illustration of a magneto optical positioning system according to the present invention;

Figure 1:
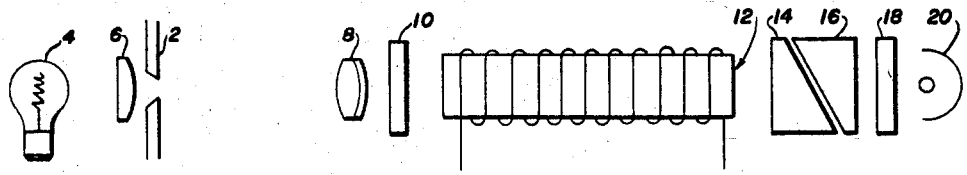

A magneto optical positioning system according to the present invention is set forth in more detail with reference to FIGS. 1–3. For example, the location of a line is determined by means of illuminating a slit 2 with an illumination system comprising a light source 4 and collimating lens 6. This produces a light line in a dark field and even though the system will work equally well with a dark line in a bright field the former is used by way of illustration. The line so formed is imaged by a lens 8. The light rays forming the image pass through a polarizer 10 and modulator 12. The light then passes through a pair of prisms 14 and 16 and through a second polarizer 18 to a photocell 20.

The two quartz prisms 14 and 16 are identical except that one is made of left hand quartz and the other of right hand quartz. Therefore, if the light falls along a plane such that the path through the left hand quartz with respect to the path through the right hand quartz are equal, there will be no rotation caused by the pair of prisms. When the image falls on either side of the aforementioned position there will be a rotation caused by the quartz prisms. This rotation will be either right hand or left hand dependent upon which side of the null plane the image passes. The amount of rotation is proportional to the displacement of the image.

For example, if the angle on the quartz prisms is such that a displacement of the line image by one millimeter decreases the left hand quartz path by 0.5 millimeter, and increases the right hand quartz path by 0.5 millimeter, the total rotation will equal the rotation produced by one millimeter of quartz. At the D line of sodium this rotation is equal to 22° with unit magnification. With higher magnification higher sensitivities are expected.

Figure 2:
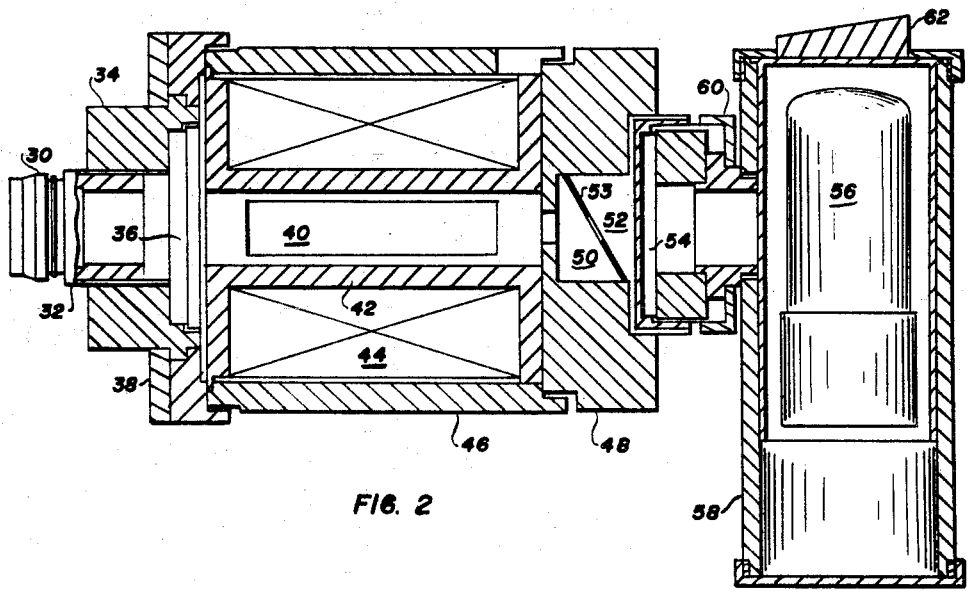
FIG. 2 is a cross sectional view of an optical system shown in FIG. 1.

FIG. 2 shows a cross sectional view of a magneto optical system such as the one shown in FIG. 1. A lens 30 is disposed in a focusing mount 32 and so constructed and arranged to provide unit magnification at 1 to 1 conjugates. The focusing mount 32 is threaded into a polarizer mount 34. A polarizer 36 is adjusted and clamped in place by means of a clamp ring 38. A modulator 40 comprises for exmple, a 60 millimeter rod of flint glass which is hydrogen blackened to reduce the adverse affects of stray light and is cemented into a coil form 42 and is surrounded by a coil 44 and outer housing 46. The coil form 42 is held in place by a prism mount 48 which also holds the two prisms 50 and 52. The two prisms 50 and 52 are separated by a mask 54 which serves as a field stop. A second polarizer 54 is disposed adjacent a photomultiplier 56 which is contained in its housing 58. The assembly including the housing 58 and photomultiplier 56 is mounted to the modulator housing by means of a lock ring 60. The housing 58 also includes a shutter operated by a handle 62 which darkens the photomultiplier.

Figure 3:
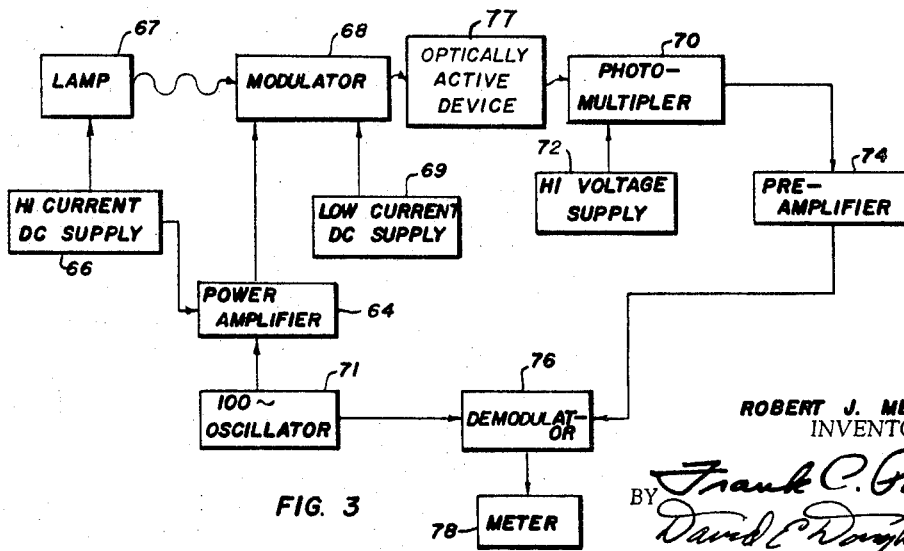
FIG. 3 is a block diagram of an electronic system used in conjunction with the system shown in FIGS. 1 and 2.

An electronic system used in conjunction with the aforementioned system is shown in more detail in FIG. 3. Referring to that figure, a power amplifier 64 is driven by a high current DC power supply 66. The power supply 66 also serves as a source of power for a lamp 67. A modulator 68 includes a coil which is connected to the amplifier 64 and to a low current DC supply 69. A standard signal omega ($\omega$) produced by an oscillator 71 is amplified by the amplifier 64 and fed to the modulator 68. The low current DC supply 69 supplies a DC bias to the modulator coil and is used as a compensator in the system. A high voltage power supply 72 powers a photomultiplier 70 which detects the variations in light intensity impinging thereupon. Such variations are caused by the change in magnetic field produced by the alternating current passing through the coil of the modulator 68 or by displacement of an object such as the slit 2 shown in FIG. 1. The signal produced by the photomultiplier 70 is fed to a preamplifier 74 which amplifies the signal. The amplified signal is fed to a conventional demodulator 76 which compares the phase and amplitude of the photomultiplier signal with a standard signal omega. The standard signal omega is fed to the demodulator 76 from the oscillator 71. A meter 78 is connected to the demodulator 76 and indicates differences between the signal from the photomodulator 70 and oscillator 71. These differences indicate the direction and displacement of an object. When a beam passes through equal portions of the quartz prisms 14 and 16 of FIGURE 1 or the quartz prisms 50 and 52 of FIGURE 2, a second harmonic 2 omega ($2\omega$) of the oscillator signal omega is generated by the photomultiplier tube. When a beam passes through unequal portions of the prisms a fundamental signal corresponding to the oscillator signal ($\omega$) is generated by the photomultiplier tube. The fundamental signal omega ($\omega$) has an amplitude determined by the magnitude of the unbalance in the path lengths of the prisms. The phase of the fundamental signal omega ($\omega$) is determined by the prism having the greater path length. The demodulator 76 rejects the second harmonic ($2\omega$) and monitors the fundamental signal ($\omega$) to generate an output signal having a polarity and amplitude determined by phase and amplitude of the fundamental signal ($\omega$) respectively.

Figure 4:
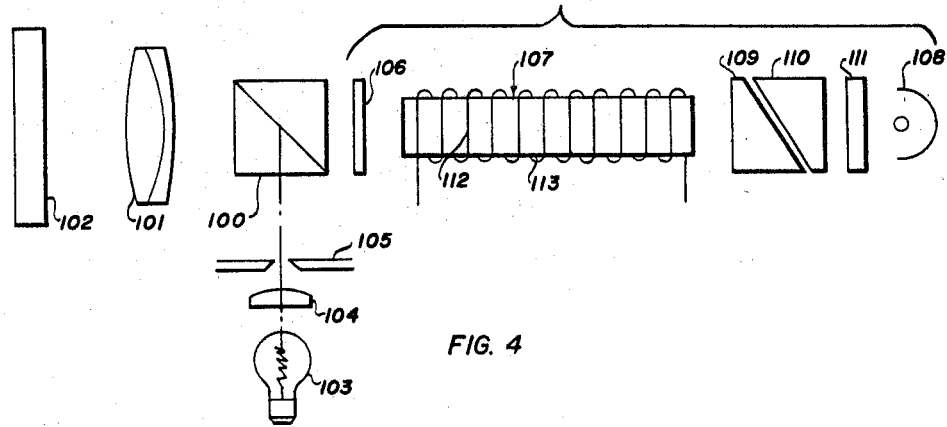
FIG. 4 is a schematic illustration of an auto-collimator according to the present invention.

An autocollimator according to the present invention is shown in FIG. 4. The autocollimator includes a beam splitter 100, a collimating lens 101 and a mirror 102. A light source 103, lens 104 and slit 105 are adapted to project an image of the slit 105 onto the mirror 102. The image is projected by way of the beam splitter 100 and through the collimating lens 101. The mirror 102 reflects the image back through the collimating lens 101 and through the beam splitter 100 to the optical system which includes position sensitive polarization means, magneto optical modulation means and electrical means for producing a signal. The image passes through a first polarizer 106 and through a modulator 107 to a photocell 108. The modulator 107 is separated from the photocell 108 by a pair of quartz prisms 109, 110 and a second polarizer 111.

The quarts prisms 109 and 110 are identical except that one is made of left hand quartz and the other of right hand quartz. Therefore, if the light falls along a plane such that the path through the left hand quartz with respect to the path through the right hand quartz are equal, there will be no rotation caused by the pair of quartz prisms. When the image falls on either side of the aforementioned position the plane of the bundle of polarized light will be rotated in an amount proportional to the displacement of the image. Since the polarizer 111 is disposed at right angles with respect to the polarizer 106 no light will pass to the photocell 108 in the absence of rotation. Rotation is caused by the pair of quartz prisms and also by the Faraday magneto optical effect of the modulator 107 when an alternating current omega is passed through the coil 112. The alternating current affects the magnetic field in the coil and thereby changes the rotation due to the effect on the transparent media 113.

A novel alignment telescope according to the present invention is described with reference to FIGS. 5–7. The arrangement shown therein overcomes the difficulty in constructing an alignment telescope which relates to the required straightness of the focusing motion. Since this straightness governs the tracking accuracy of the telescope it is desirable to build an alignment telescope which is capable of focusing any point on its axis without mechanical motion of any kind. The telescope shown in FIGS. 5–7 overcomes this problem to a high degree. In building a novel telescope according to the present invention it should be noted that the pair of quartz prisms have been replaced by two plane parallel quartz plates 124 and 125, each with its axis parallel to the optic axis of the telescope. These quartz plates are cemented between glass prisms 126, 127 and 128 of matching index. Other elements in the system include a polarizer 120, modulator 121, analyzer 122 and photocell 123. FIG. 6 shows that a light ray O traverses equal paths through the left and right hand quartz and therefore no rotation is produced. A ray $A_1$ however, receives more right hand rotation than left hand rotation because of the angle at which the ray passes through the plates. This rotational unbalance will produce a signal at the fundamental frequency $\omega$. There is also a ray $A_2$ which receives more left hand rotation than right hand rotation. From this ray it is also possible to get a frequency signal. The signal from the ray $A_2$ is 180° out of phase with the signal $A_1$. The two signals therefore cancel each other and there is no fundamental $\omega$ frequency signal.

Figure 7:
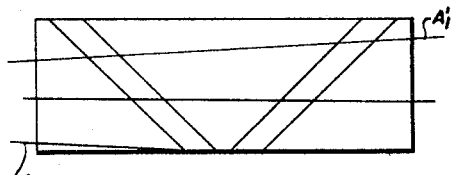
FIG. 7 is a schematic illustration of the ray paths passing through an optical element shown in FIG. 5; but in which the ray paths have deviated.

FIG. 7 illustrates the situation wherein the light ray which is parallel to the optic axis is no longer coincident with that axis. In this case there is a peripheral ray $A_1'$ however, there is no corresponding ray $A_2'$. In this case there is an unbalance in the system which produces a $\omega$ fundamental frequency signal.

Figure 5:
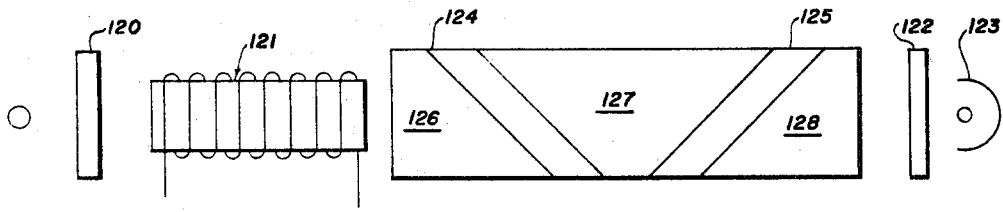
FIG. 5 is a schematic illustration of an alignment telescope according to the present invention.
Figure 6:
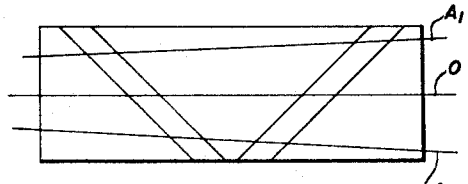
FIG. 6 is a schematic illustration of the ray paths passing through an optical element shown in FIG. 5.

The system shown in FIGS. 5–7 is capable of alignment in only one direction. By arranging two systems such as the one shown, at right angles to each other, with a beam splitter would overcome this difficulty. Similarly a Wollaston prism system such as the one shown hereinafter in FIG. 9 could be used to obtain a two directional system.

Figure 8:
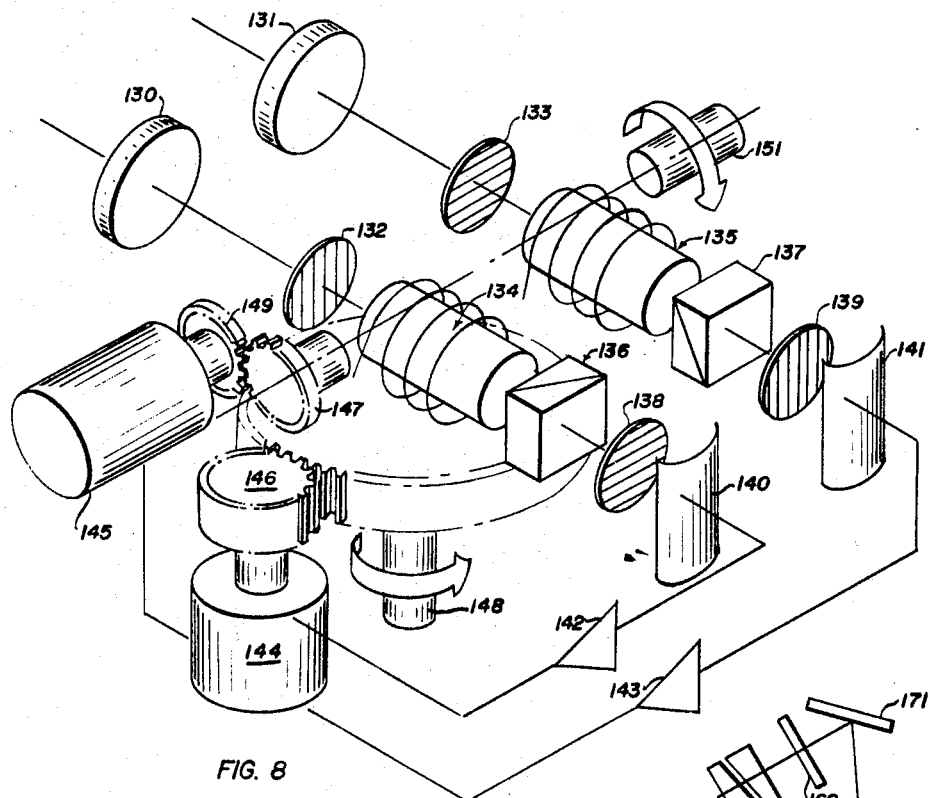
FIG. 8 is a schematic illustration of a tracking telescope according to the present invention.

A tracking telescope according to the present invention is shown in FIG. 8 wherein a pair of telescopes 130 and 131 are used for azimuth and elevation respectively. The system advantageously has a relatively wide field which makes target acquisition relatively simple. Accordingly it has applications for either missile or star tracking. An image formed by the telescope 130 passes through a polarizer 132, modulator 134 and a pair of quartz prisms 136. The image then passes through a second polarizer 138 to the photocell 140. The signal produced by the photocell 140 is fed into an amplifier 142. The amplifier 142 is connected to the motor 144 which drives the gear 146 to thereby rotate the telescope about the azimuth axis 148.

An image from the telescope 131 passes through a polarizer 133, modulator 135 and prism assembly 137. The image passing through the prism assembly 137 passes through an analyzer 139 to a photodetector 141. The photodetector 141 produces a signal in response to the light intensity impinging thereupon. The signal is delivered through the elevation amplifier 143 to a motor 145. The motor 145 drives the gear 147 by means of the gear 149 to thereby rotate the telescope 131 about the elevation axis 151.

Figure 9:
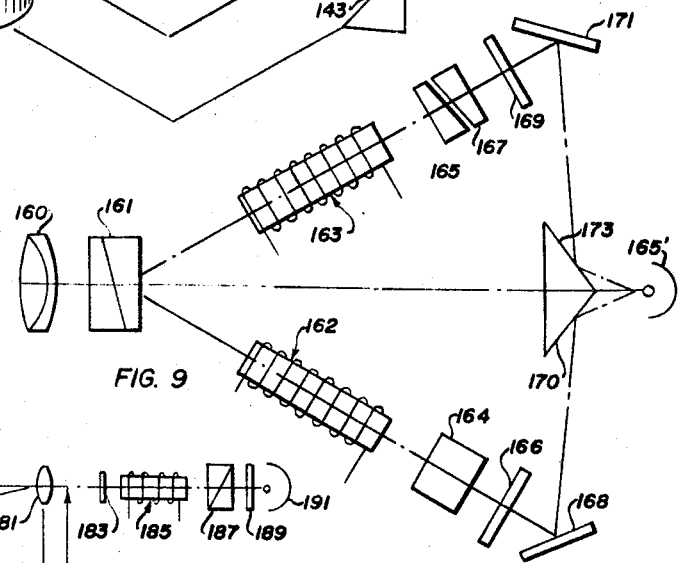
FIG. 9 is a schematic illustration of another tracking device of the present invention.

The tracking system shown in FIG. 9 is generally similar to the one shown in FIG. 8 except that a single telescope 160 is used to give both azimuth and elevation information. In this case the light passing from the telescope 160 is directed toward the Wollaston prism 161. The prism 161 separates the incident light beam into two divergent polarized light beams which are polarized at right angles to each other. Operating the modulators 162, 163, 90° out of phase with each other also enables a single photomultiplier 165' to be used. For example, the light passing through the modulator 163 passes through the quartz prisms 165, 167 and through an analyzer 169. The light passing through the modulator 169 is reflected by means of the mirrors 171 and 173 to the photomultiplier 165'. Similarly, the light passing through the modulator 162 passes through a prism assembly 164, polarizer 166 and is reflected by the mirror surfaces 168 and 170 to the photodetector 165'.

Figure 10:
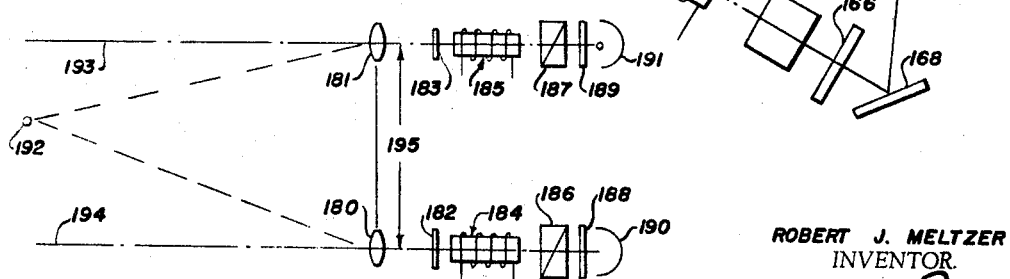
FIG. 10 is a schematic illustration showing a range finder which incorporates the novel features of the present invention.

A range finder is shown in FIG. 10. The range finder includes a pair of telescopes 180, 181. The light passing through the telescope 180 passes through a polarizer 182, modulator 184 and prism assembly 186. The light rays passing through the prism assembly 186 also pass through an analyzer 188 to a photodetector 190. The second telescope 181 directs light through a polarizer 183, modulator 185, prism assembly 187 and analyzer 189 to a detector 191. The system detects the range of an object 192 by detecting the departure of the object from a zero line 194 of the telescope 180 and from a zero line 193 of the telescope 181. The departure from these lines is taken with respect to a base line 195. Advantageously, this system does not depend on Vernier or stereo acuity. Also it need not be pointed accurately at the target since the error signal from the telescope may be subtracted from the other to give range without pointing.

Figure 11:
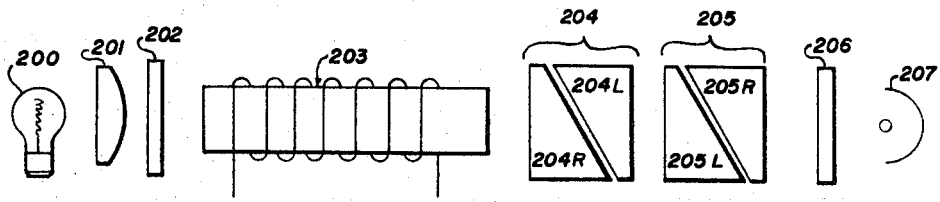
FIG. 11 is a schematic view showing a motion transducer according to the present invention.

FIG. 11 illustrates a novel motion transducer according to one embodiment of the invention. The transducer includes a lamp 200, condenser 201, polarizer 202 and modulator 203. The system also includes two pair of prisms 204 and 205 as well as an analyzer 206 and a photodetector 207. Each pair of prisms includes a prism 204L, 205L made of left hand quartz and a prism 204R, 205R which are made of right hand quartz. The prisms 205L and 205R are positioned in a manner opposite that of or in opposing relation to the prisms 204L and 205L. The first pair 204 is allowed to translate in the plane of the diagram and perpendicular to the optic axis. When the two pair of prisms are aligned light passes through equal paths of left and right hand quartz and therefore there will not be an omega fundamental signal, but only a two omega second harmonic signal which is attributed to the alternating current passing through the modulator 203. For all other positions of the pair of prisms 204 there will be an omega fundamental signal whose phase will depend on the direction of displacement of the movable pair. It should be noted that the waveform of the polarized beam emerges from the prisms 204 and 205 uniformly despite any change in position of the movable prism 204. This is because the beam of radiation, regardless of its size, effectively passes through equal portions of the right and left hand prisms regardless of the change in position of the prisms 204.

One advantage of the aforementioned system is that light is received over the entire aperture and therefore the signal will be higher than in the aforementioned line locater. This will allow the use of a cadmium sulfide detector and therefore facilitates making a compact unit. If a thin film modulator is then provided the system will be exceptionally compact and yet will offer the high sensitivity required.

Figure 12:
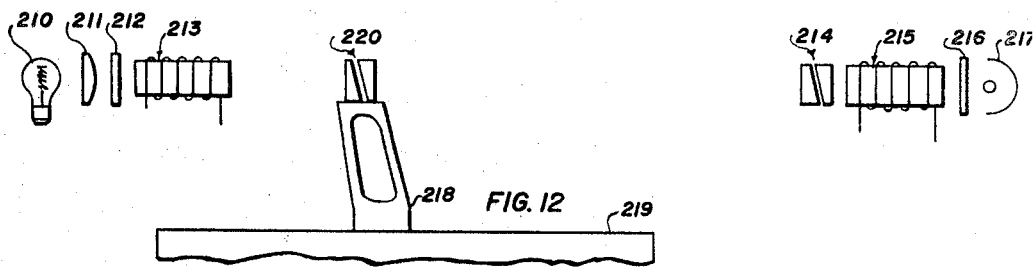
FIG. 12 is a schematic illustration of apparatus for checking the surfaces of plates according to the present invention.

Another application of the present invention is shown in FIG. 12. This figure illustrates apparatus which is adapted to measure the flatness of a surface plate. The apparatus includes a lamp 210, collimator 211, polarizer 212 and modulator 213. The aforementioned elements are arranged as a projector which projects a beam of light toward a pair of prisms 214. A modulator 215 includes a DC coil for measurement purposes and an analyzer 216 and photodetector 217 are adapted to receive light passing through the modulator 215. A carriage 218 is adapted to slide along a line on the surface plate 219. The carriage 218 carries a pair of prisms 220 positioned in opposition to the pair of prisms 214 in a manner illustrated in FIGURE 11.

In operation the carriage 218 is slid from one end of the plate 219 to the other. The projector and receiver ends are fixed. As the carriage 218 moves along the plate variations in surface level are indicated as variations in the displacement of the moving prism pair. These variations in displacement would be compensated with suitable electronics in response to variations in current in the DC coil. A record of this current provides a record of variations in flatness in the surface plate. Conversely the displacement signal could be used to control the vertical position of the movable prisms and thereby generate a straight line from an irregular surface.

Figure 13:
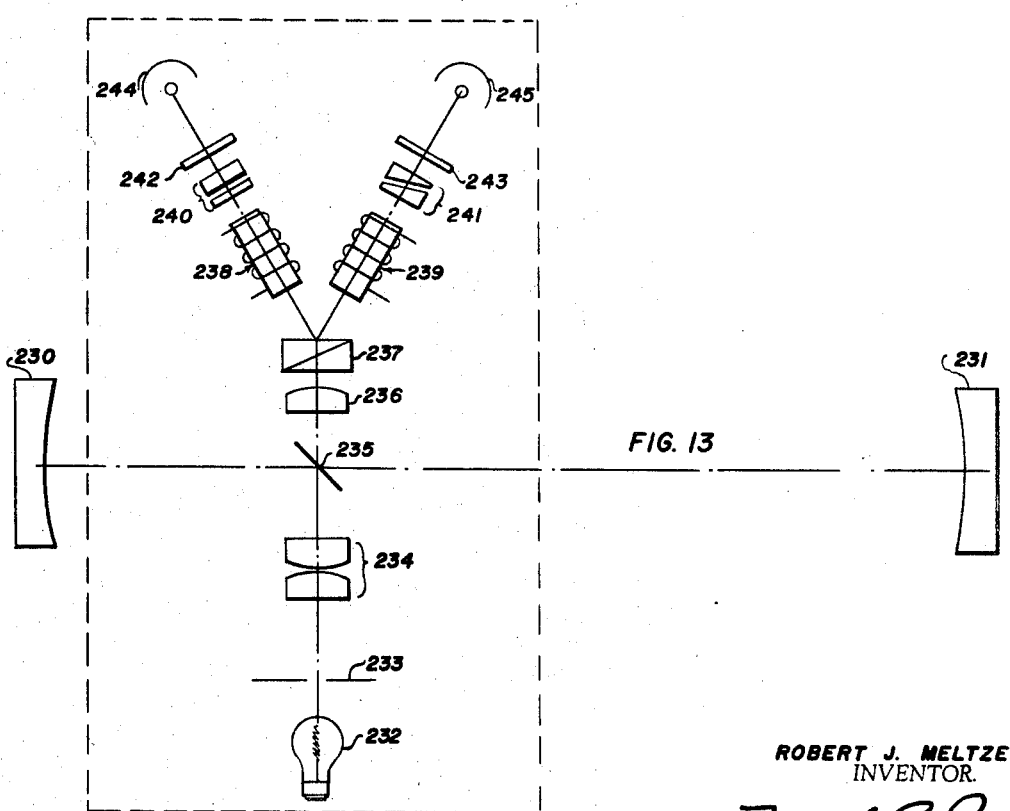
FIG. 13 is a schematic view showing apparatus for generating straight ways according to the present invention.

Another system for generating straightways is shown in FIG. 13. The system shown therein includes two concave mirrors 230 and 231. The two mirrors are separated by their common radius in an arrangement whereby the image of any point on the line joining the centers of the two spheres is imaged back upon itself but inverted. In this system the two mirrors 230 and 231 are fixed and the magneto optical system is a movable element. In this system the phase sensitive signals similar to those previously described are used to measure or control straightness. In this system a light source 232 illuminates a slit 233 which is imaged by means of the lens assembly 234 and beam splitter 235 onto the mirror 230. The image of the slit is imaged back upon itself but inverted. The image is then reflected through the lens 236 and through the Wollaston prism 237. The prism 237 separates the incident light into two divergent polarized light beams which are polarized at right angles to each other. These beams are directed through the modulators 238, 239, prism assemblies 240, 241 and analyzers 242, 243 to the detectors 244, 245 respectively. The control in this system is similar to the system shown with respect to the other embodiments of the invention.

Figure 14:
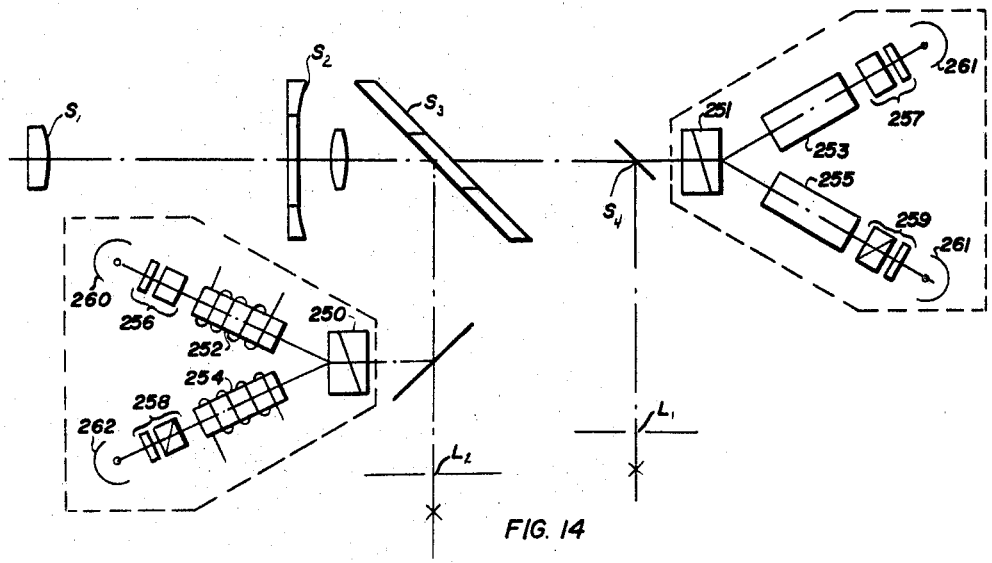
FIG. 14 is a schematic view showing a bearing correction system according to the present invention.

FIG. 14 shows a novel bearing correction system according to one embodiment of the invention. According to this embodiment the bearings whose runout should not exceed 0.5 microinches and could conceivably be reduced to 0.05 microinches can be constructed. The bearing axis is defined by the centers of two reflecting spheres $S_1$ and $S_2$ which rotate with the bearing. The spherical surface $S_1$ transmits light to its focal point which is conjugate to a pair of photocells 260, 262. A screen or mirror (not shown) is placed at the focal point of the spherical surface $S_1$ so that displacements of the image from a null position will be sensed by the photocells 260, 262. The surface $S_1$ could be replaced by a concave reflective surface to obtain the same end result. These surfaces are illuminated by a pair of illuminated slits $L_1$ and $L_2$ by means of a pair of beam splitters $S_3$, $S_4$. Detection of displacement is obtained by light reflected to two separate two-dimensional magneto optical detectors. The signals from the magneto optical detectors are used to maintain the positions of the centers of the reflecting spheres invarient and since these centers define the bearing axes, a true bearing is obtained.

Each of the magneto optical systems includes a Wollaston prism 250, 251, a pair of modulators 252, 254 and 253 and 255. Similarly each of the sub-systems includes two pairs of quartz prisms identified as 256, 258 and 257, 259 respectively. The sub-systems also include a pair of photodetectors 260, 262, 261 and 263. The operation of these sub-systems is generally similar to the operation of the devices shown in FIG. 13.

Figure 15:
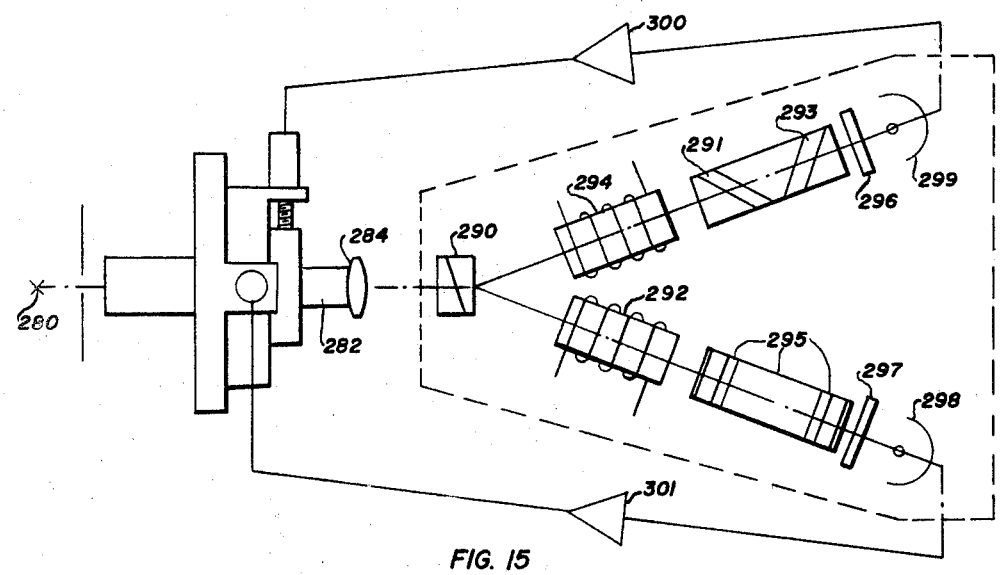
FIG. 15 is a schematic view showing a lens centering apparatus according to the present invention; and, FIG. 16 is a schematic view showing a second system for generating straight ways.

A two dimensional magneto optical alignment telescope can also be used to provide signals for atuomatic lens centering as illustrated with repsect to FIG. 15. In this figure a point source 280 and the two dimensional alignment telescope are fixed. The light from the point source 280 passes through a hollow spindle 282 of the centering machine and through a lens 284 to the alignment telescope assembly. The signals from the telescope are used to control the drive motors of the lens chuck to center the lens on the spindle. Centering then proceeds according to conventional practice.

The magneto optical portion of this device includes a Wollaston prism 290, and a pair of modulators 292, 294. The system also includes two pair of plane parallel quartz plates. The first pair 291, 293 are angularly disposed with respect to each other and a second pair of plane parallel quartz plates 295 which are also angularly disposed to each other but are rotated 90° with respect to the first pair. A pair of polarizers 296, 297 are disposed between a pair of photocells 298, 299 and the respective pairs of plane parallel plates. The signals from the telescopes are detected by the photocells 298, 299 and fed to a pair of amplifiers 300, 301. This amplified signal controls the drive motors of the lens chuck to thereby center the lens on the spindle. Since the magneto optic alignment telescope has no focal elements itself it is independent of the focal length of the lens being centered. If the lens being centered is a very short focal length the signal to noise ratio may fall to a low value. In such case it may be necessary to add a fixed compensating lens. This system could also be adapted for use in reflection by autoreflecting from the lens surfaces.

Figure 16:
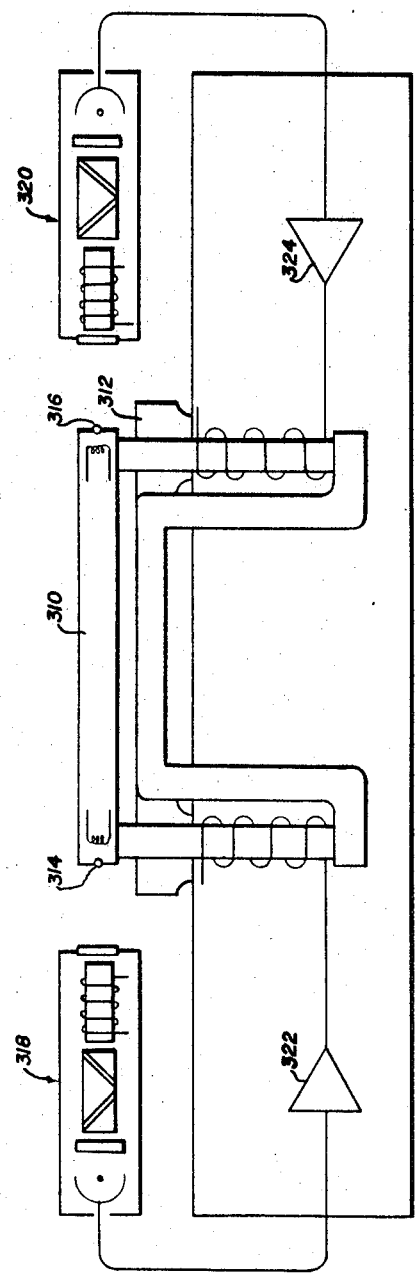

FIG. 16 illustrates another embodiment of the invention which is adapted for generating straightways. This embodiment includes a controlled carriage 310 and a sleeve carriage 312. The control carriage 310 includes two light sources 314, 316 which are aligned with a pair of magneto optical alignment telescopes 318, 320. The alignment telescopes 318, 320 are made according to the embodiment of the invention shown and described in connection with FIG. 5. The output of the photocells of the alignment telescopes 318, 320 are connected to a magneto strictive motor through the amplifiers 322 and 324. This system can be used to measure flatness or for generating straightways.

What is claimed is:

1. A combination comprising a magneto optical modulator, circuit means for applying a periodic signal to said modulator, a polarizer, means for directing a polarized beam of radiation through said modulator to said polarizer, polarization rotating means comprising first and second optically active means mounted in series in said beam before said polarizer, at least one of said optically active means being movable along a path transverse said beam, said polarization means uniformly polarizing said beam and rotating the polarization of said beam in accordance with the relative displacement between said first and second optically active means in a direction normal to the axis of said beam, photoelectric means receiving said beam from said polarizer and circuit means coupled to said photoelectric means and said above-mentioned circuit means for providing a signal indicative of the sense and displacement between said first and second optically active means normal to the axis of said beam.

2. The combination comprising a magneto optical modulator comprising a coil and a transparent member disposed within said coil, means supplying alternating current to said coil for varying the direction and magnitude of the magnetic field within said coil to thereby rotate the plane of polarized light passing through said transparent member, radiation sensitive means for generating an electrical signal in response to radiation applied thereto, means for directing a beam of polarized radiation through said transparent member to said radiation sensitive means, a stationary pair of optically active wedges of opposite rotation inverted with respect to each other positioned in said beam, a movable pair of optically active wedges of opposite rotation inverted with respect to each other mounted in said beam in series with said stationary pair so that said movable pair interacts with said stationary pair for uniformly polarizing said beam and for rotating the polarization of said beam as a function of the position of said movable pair with respect to said stationary pair, a polarizer positioned in said beam beyond said pairs of wedges and said transparent member but before said radiation sensitive means, and electrical means coupled to said radiation sensitive means for comparing the signal developed by said radiation sensitive means with said alternating current and producing a signal indicative of the sense and displacement of said movable pair of wedges.

3. The combination comprising two pairs of quartz wedges wherein one wedge of each pair comprises left hand quartz and the other wedge of each pair comprises right hand quartz, a magneto optical modulator comprising a coil and a transparent media disposed within said coil, means supplying alternating current to said coil for varying the direction and magnitude of the magnetic field within said coil to thereby rotate the plane of polarized light passing through said transparent media, radiation sensitive means for generating an electrical signal in response to light applied thereto, means for directing polarized light through said transparent media to said radiation sensitive means, means for stationary mounting one pair of said pairs of wedges in said beam with the wedges inverted with respect to each other so that the dimension of the pair of wedges in the direction of the beam is substantially constant, means for movably mounting the other of said pairs of wedges in series with said one pair for movement transverse the beam with the right and left hand quartz wedges inverted with respect to the right and left hand quartz wedges of the other pair and so that the dimension of the pair of wedges in the direction of the beam is substantially constant, a polarizer positioned in said beam beyond said pairs of wedges and said transparent media but before said radiation sensitive means and electrical means coupled to said radiation sensitive means for comparing the signal generated by said radiation sensitive means with said alternating current for producing a signal indicative of the sense and displacement of said movable pair of quartz wedges.

4. A magneto optical system comprising a source of nominally monochromatic light, a pair of polarizers disposed at right angles with respect to each other, a magneto optical modulator comprising a coil and a transparent rod disposed within said coil, said modulator receiving light passing through one of said polarizers from said source and directing light to the other of said pair of polarizers, means providing a source of alternating current to said coil for producing a magnetic field which varies the polarization of light passing through said transparent rod, a photocell, means for directing a beam of light through said rod and said pair of polarizers to said photocell, position sensitive polarization means including a stationary pair of quartz wedges of opposite optical rotation inverted with respect to each other, and a movable pair of quartz wedges of opposite optical rotation inverted with respect to the wedges of like rotation of said stationary pair, means positioning said polarization means in series between one of said polarizers and said photocell and separated from said photocell by a second of said polarizers so that the beam passes through said stationary pair of quartz wedges and said movable pair of quartz wedges and circuit means coupled to said photocell and said means providing a source of alternating current for providing a signal corresponding to the direction and displacement of said movable pair of quartz wedges transverse said beam.

5. A motion transducer comprising a first pair of quartz wedges of left hand and right hand quartz inverted with respect to each other and a second pair of quartz wedges of left and right hand quartz with the right and left hand quartz wedges respectively inverted with respect to the corresponding wedges of said [stationary] first pair, a pair of polarizers, a magneto optical modulator comprising a coil and a transparent media disposed within said coil and located between said polarizers, means supplying alternating current to said coil for varying the direction and magnitude of the magnetic field within said coil to thereby rotate the plane of polarized light passing through said transparent media, photoelectric means producing a signal indicative of the light intensity impinging thereon, means for directing a beam of radiation through said pair of polarizers and transparent media to said photoelectric means, means for stationary mounting said first pair of wedges in said beam between said pair of polarizers, means for movably mounting said second pair of wedges in said beam adjacent to and in series with said first pair and circuit means coupled to said photoelectric means for comparing the signal produced by said photoelectric means with the alternating current applied to said coil to produce a signal corresponding to the movement of the second pair of quartz wedges transversely to said beam.

6. The combination comprising a magneto optical modulation means including a radiation transparent member for displacing the polarization of radiation passing therethrough in response to a magnetic field and circuit means for applying a magnetic field to said transparent member, radiation sensitive means for generating an electrical signal in response to radiation applied thereto, means for directing a polarized beam of radiation through said transparent member of said radiation sensitive means, polarization rotating means comprising first and second optically active means mounted in series in said beam before said polarizer, at least one of said optically active means being movable along a path transverse said beam, said polarization means uniformly polarizing said beam and rotating the polarization of said beam in accordance with the relative displacement between said first and second optically active means in a direction normal to the axis of said beam, a source of alternating current coupled to said circuit means in said magneto optical modulation means for generating a periodically varying magnetic field, a polarizer positioned in said beam after said modulation means and said first and second optically active means but before said radiation sensitive means, and circuit means for comparing the phase of said alternating current to the signal generated by said radiation sensitive means thereby providing a measurement of the sense and the amount of displacement between the first and second optically active means normal to the axis of said beam.

7. An electro-optical system comprising, optical modulation means including a transparent media and circuit means for applying an electrical field to said transparent media to rotate the plane of polarization of radiation passing therethrough, means for providing an alternating signal to said circuit means, first and second optically active wedges that rotate the plane of polarization of radiation passing therethrough in one direction, third and fourth optically active wedges that rotate the plane of polarization of radiation passing therethrough in the opposite direction, radiation sensitive means for generating an electrical signal in response to radiation applied thereto, means for directing a polarized beam of radiation through said transparent media, to said radiation sensitive means, means for stationary mounting said first and third optically active wedges in said beam with the third wedge inverted with respect to said first wedge, means for movably mounting said second and fourth optically active wedges in said beam in series with said first and third wedges and with the second and fourth wedges inverted with respect to said first and third wedges respectively, a polarizer positioned in said beam before said radiation sensitive means but after said media and said optically active wedges, and circuit means coupled to said means providing said alternating signal and said radiation sensitive means for generating a signal corresponding to the sense and amount of movement of said second and fourth optically active wedges transverse said beam.

8. An electro-optical system comprising, a magneto-optical modulation means including a radiation transparent element and a coil for applying a field to said transparent element for rotating the plane of polarization of radiation passing through said transparent element, means for applying an alternating signal to said coil, first and second optically active elements having tapered shapes for rotating the plane of polarization of radiation passing therethrough, third and fourth optically active elements having tapered shapes for rotating the plane of polarization of radiation passing therethrough in a direction opposite that of said first and second optically active elements, means positioning said first and third optically active elements adjacent each other with their tapered shape converging in opposite directions, means positioning said second and fourth optically active elements adjacent each other with their tapered shapes converging in opposite directions, radiation sensitive means for generating an electrical signal in response to radiation applied thereto, means for directing a beam of polarized radiation through said transparent element to said radiation sensitive means, means for stationary mounting said first and third optically active elements in said beam, means for movably mounting said second and fourth optically active elements in said beam in series with said first and third elements for movement transverse said beam, the tapered shapes of said second and fourth elements being inverted with respect to said first and third optically active elements respectively, a polarizer positioned in said beam after said optically active elements and said transparent element but before said radiation sensitive means and circuit means coupled to said radition sensitive means and said means for applying an alternating signal for comparing the electrical signal generated by said radiation sensitive means to said alternating signal for generating a signal that is a function of the position of the second and fourth optically active elements with respect to said first and third optically active elements.

References Cited

UNITED STATES PATENTS

| 2,933,972 | 4/1960 | Wenking | 350—151 |
| 2,974,561 | 3/1961 | Hardy et al. | 88—1414 |

OTHER REFERENCES

Gates, J. W., An Automatic Recording Saccrimeter, Chemistry and Industry Feb. 15, 1958, pp. 190–193.

Jenkins et al., Fundamentals of Optics, third Ed., New York, 1957, pp. 598–599.

Meltzer, R. J., Magneto Optic Positioning, IEE transactions or Ind. Elec., vol. 1E10, No. 1, May 1963, pp. 46–56.

Wenking, Z. Instrumentkunde, January 1958, pp. 1–5.

JEWELL H. PEDERSEN, *Primary Examiner.*

A. A. KASHINSKI, *Assistant Examiner.*

U.S. Cl. X.R.

350—151, 159; 356—153, 147, 141, 4